United States Patent
Oristian et al.

(10) Patent No.: US 9,065,916 B2
(45) Date of Patent: Jun. 23, 2015

(54) SYSTEM AND METHOD FOR VIRTUAL QUEUING OF CALLS

(71) Applicant: CALLPROMISE, LLC, Richmond, VA (US)

(72) Inventors: Thomas M Oristian, Richmond, VA (US); Michael P Oristian, Richmond, VA (US)

(73) Assignee: CALLPROMISE, LLC, Richmond, VA (US)

( * ) Notice: Subject to any disclaimer, the term of this patent is extended or adjusted under 35 U.S.C. 154(b) by 0 days.

(21) Appl. No.: 13/908,234

(22) Filed: Jun. 3, 2013

(65) Prior Publication Data

US 2013/0322615 A1    Dec. 5, 2013

Related U.S. Application Data

(60) Provisional application No. 61/654,588, filed on Jun. 1, 2012.

(51) Int. Cl.
  *H04M 3/523*    (2006.01)
(52) U.S. Cl.
  CPC .......... *H04M 3/5231* (2013.01); *H04M 3/5232* (2013.01)
(58) Field of Classification Search
  USPC ........ 379/265.01–265.14, 266.01–266.1, 309
  See application file for complete search history.

(56) References Cited

U.S. PATENT DOCUMENTS

| | | | | |
|---|---|---|---|---|
| 672,488 | A * | 4/1901 | Miller | 454/333 |
| 5,627,884 | A | 5/1997 | Williams | |
| 6,049,063 | A * | 4/2000 | Barber | 219/213 |
| 6,263,065 | B1 | 7/2001 | Durinovic-Johri | |
| 6,449,646 | B1 | 9/2002 | Sikora | |
| 6,650,731 | B1 * | 11/2003 | Steltner et al. | 379/15.01 |
| 6,704,404 | B1 | 3/2004 | Burnett | |
| 6,788,779 | B2 * | 9/2004 | Ostapchuck | 379/265.02 |
| 7,065,203 | B1 * | 6/2006 | Huart et al. | 379/266.06 |
| 7,274,787 | B1 * | 9/2007 | Schoeneberger | 379/265.01 |
| 7,430,290 | B2 | 9/2008 | Zhu | |
| 7,929,685 | B1 | 4/2011 | Boyet | |
| 7,933,398 | B1 | 4/2011 | Laurinavichus | |

(Continued)

OTHER PUBLICATIONS

Addad, "A Virtual Queuing based Algorithm for Delays Evaluation in Networked Control Systems," Industrial Electronics, IEEE Transactions on (vol. 58, Issue: 9), Dec. 10, 2010, pp. 4471-4479.

*Primary Examiner* — William Deane, Jr.
(74) *Attorney, Agent, or Firm* — Timothy J. Bechen; Bechen PLLC

(57) ABSTRACT

The present method and system provides a virtual queuing technique including the method and system providing for receiving a communication request from a user for telephonic communication with a communication agent, wherein the communication request includes user information. The method and system includes receiving a call back request from the user to avoid the on-hold wait time and based on the call back request, placing the communication request and the user information associated therewith into a queuing system. The method and system thereby meters the communication request in the queuing system for a metered wait time based at least on a queuing factor relating to at least one of: the on-hold wait time and the user information and after expiration of the metered wait time, bridges a communication connection with the user and the communication agent based on the communication request.

20 Claims, 12 Drawing Sheets

(56) References Cited

U.S. PATENT DOCUMENTS

| | | | |
|---|---|---|---|
| 8,249,245 B2* | 8/2012 | Jay et al. | 379/266.01 |
| 8,472,612 B1* | 6/2013 | Goringe et al. | 379/266.01 |
| 2005/0025303 A1* | 2/2005 | Hostetler, Jr. | 379/265.02 |
| 2006/0221941 A1 | 10/2006 | Kishinsky | |
| 2007/0041565 A1* | 2/2007 | Williams et al. | 379/265.02 |
| 2007/0168472 A1* | 7/2007 | Walter | 709/220 |
| 2008/0228551 A1* | 9/2008 | Yamanaka | 705/9 |
| 2010/0266115 A1 | 10/2010 | Fedorov | |
| 2011/0038476 A1* | 2/2011 | Anisimov et al. | 379/265.14 |
| 2011/0286444 A1 | 11/2011 | Petrovykh | |
| 2012/0321070 A1* | 12/2012 | Smith et al. | 379/265.09 |

\* cited by examiner

SYSTEM AND METHOD FOR VIRTUAL QUEUING OF CALLS

RELATED APPLICATIONS

The present application relates to and claims priority to U.S. Provisional Patent Application Ser. No. 61/654,588 entitled "METHOD AND SYSTEM FOR VIRTUAL QUEUING OF CALLS" filed Jun. 1, 2012.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present application relates to call center management operations and more specifically to processing call center operations including the virtual queuing of calls.

Call centers receive calls from numerous customers. The high volume of calls often necessitates the use of call queues in which the customers must wait until an agent of the call center is available to assist the caller. However, in call systems utilizing virtual queuing, a customer may opt to receive a call back from an agent of the call center instead of waiting on the phone. If so, the call remains in the queue of the call center, but the customer may disconnect from the call. When the customer's call reaches the head of the queue, the call center calls the customer back and connects the customer to an agent. As such, in typical virtual queuing systems, each call is queued either normally (i.e., the customer waits on the line) or virtually (i.e., the customer is called back). Such functionality occurs completely within the call center and may require additional devices, components, software, and structure to provide the virtual queuing functionality.

There have been numerous solutions for solving the on-hold problems associated with call centers, but those solutions each have various shortcomings relating to interfacing and/or the integration with call center technology.

One call back technique is described in U.S. Pat. No. 5,627,884, wherein the user enters a call back number and the call center then calls the user back after the standard on-hold wait time. In this technique, the user disconnects, but the call itself remains in the same customer queue as on-hold customers. Therefore, the technique provides that on-hold and call back customers both wait the same time. Moreover, this technique is directly integrated into the call back center, thus for the implementation of this technique, the call center itself must upgrade and install such technology. Call centers include many complex software techniques for managing efficiencies between agents and callers, the inclusion of additional hardware and technology into the call center itself not only further complicates the call center technology, but includes installation and maintenance overhead related thereto.

Another existing call back technique is described in U.S. Pat. No. 6,704,404 relating to a call center. In this technique, the caller can request a designated call back time or have the call request simply queued for the next available agent. This technique does not apply any processing or logic to the queuing of the call back, but merely filters the queued call back request consistent with a normal on-hold user. Additionally this technique is extremely inefficient for call centers because the call center is first engaged prior to calling the user. Therefore, precious call center time is wasted waiting for the user to answer the call back request, including the waste of time if the user does not answer the call.

Customer service interactions and call center activities are major cost factors for companies. These call centers are both essential to managing customers, but also relate directly to customer relations and satisfaction. Call centers themselves seek operation as maximum efficiency for not only solving the concerns of the customer, but also for managing staffing of service agents. A company seeks to find an economic medium between the staffing of call centers and managing customer expectations for service operations.

Therefore, there exists a need for call back processing technology that overcomes the problems of the existing systems. There exists a need for call back methods and systems that operates virtual to the call center itself, that properly optimize the usage of the time and availability of the call center agent, and that properly meter the queuing of call back request to manage the estimated wait time of on-hold customers and call back customers.

BRIEF DESCRIPTION

The present method and system provides a virtual queuing technique allowing for callers to avoid an on-hold wait time. The virtual queuing includes a method and system providing for receiving a communication request from a user for telephonic communication with a communication agent, wherein the communication request includes user information. The method and system includes receiving a call back request from the user to avoid the on-hold wait time and based on the call back request, placing the communication request and the user information associated therewith into a queuing system. The method and system thereby meters the communication request in the queuing system for a metered wait time based at least on a queuing factor relating to at least one of: the on-hold wait time and the user information and after expiration of the metered wait time, bridges a communication connection with the user and the communication agent based on the communication request.

In addition to be a virtual queuing system, one embodiment includes software as a service processing techniques. Therefore, the method and system operates ancillary to existing call center technology, eliminating additional call center integration and management costs. Moreover, the method and system meters the queue based on the queuing factor, whereby the virtual call and call back operations do not adversely affect the on-hold wait users and additionally the queuing factors allow for better efficient use of the call center itself.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
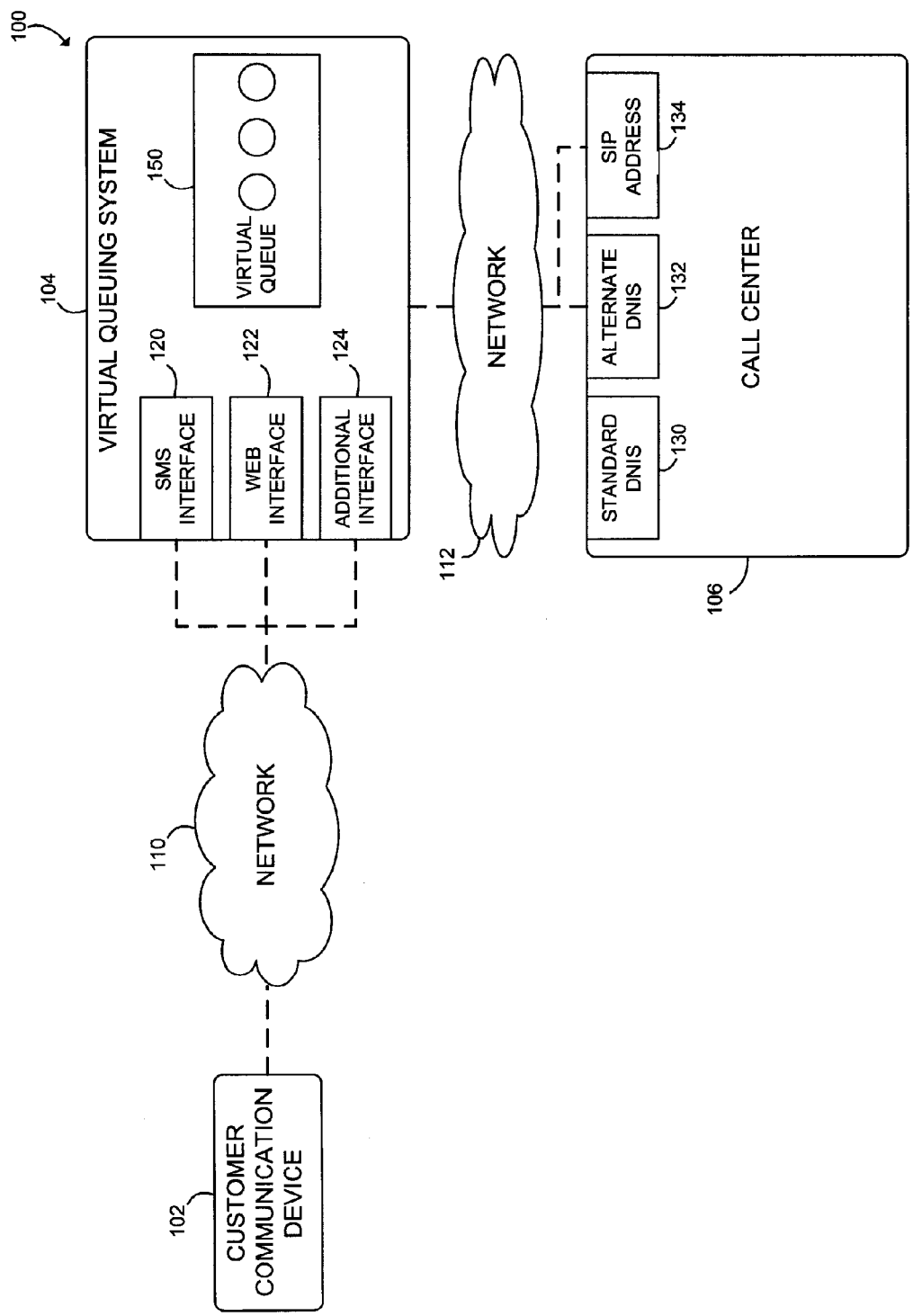
FIG. 1 is a simplified block diagram of at least one embodiment of a telecommunications system for providing virtual queuing.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Several embodiments of a virtual queuing system and associated telecommunications system for providing virtual queuing are presented in the figures and discussed in detail below. Each of the virtual queuing system embodiments provides the service of virtual queuing outside the typical structure and facility of a call center. That is, the disclosed system and method facilitate virtual queuing for call centers that do not have the devices and functionality to provide such service. In some embodiments, the virtual queuing system may handle a virtual queue of callers that may be periodically interjected into the queue of the call center based on one or more factors as discussed below.

In some of the below-described embodiments of the illustrative virtual queuing system, the caller may elect virtually queuing at any point during the call (e.g., during the primary wait time or any interstitial wait time) because the call is handled, in some manner, by the virtual queuing system rather than the call center.

Referring now to FIG. 1, in one embodiment, a telecommunications system 100 includes one or more customer communication devices 102, a virtual queuing system 104, and a call center 106. The customer communication device 102 may be embodied as any type of communication or computing device capable of communicating with the virtual queuing system 104 over a network 110 in a manner as discussed in more detail below. For example, the customer communication device 102 may be embodied as a land based phone, a cellular-based phone, a smart phone, a portable computing device, a lap top computer, a tablet computer, a desktop computer, a personal computer, a personal digital assistant, a smart television, a vehicle in-dash control or communication system, or other appliance, or other electronic communication device capable of communicating with the virtual queuing system 104 over the network 110.

The network 110 may be embodied as any type of network capable of supporting communications between the customer communication device 102 and the virtual queuing system 104. For example, the network 110 may be embodied as, or otherwise include, a telecommunications network, a land-based telephone network, a cellular phone network, a satellite-based network, a data network, a global publically-accessible network such as the Internet, and/or a combination thereof. Additionally, the network 110 may include various devices, such as routers, switches, hubs, and the like, to facilitate the communications between the customer communication device 102 and the virtual queuing system 104.

The virtual queuing system 104 may be embodied as, or otherwise include, one or more communication or data servers and/or telecommunication subsystems capable of performing the functions described herein. In the illustrative embodiment, the virtual queuing system 104 includes a short message system (SMS) interface 120 to receive SMS messages, a web or network interface 122 to receive web-based communications, and/or one or more additional interfaces 124. As discussed in more detail below, the virtual queuing system 104 is configured to receive a communication request from the user using the customer communication device 102 and/or the customer computing device 108 via one of the interfaces 120, 122, 124. For example, in embodiments in which the customer communication device 102 is embodied as a smart phone or other communication device capable of generating SMS messages, the virtual queuing system 104 may receive such SMS messages from the customer communication device 102 over the network 110 via the SMS interface 120. Alternatively, in embodiments in which the customer communication device 102 is embodied as a computing device such as a tablet or desktop computer, the virtual queuing system 104 may receive web-based communication requests (e.g., data supplied to a web-based form, e-mails, or other web-based communications) from the customer communication device 102 over the network 110 via the web interface 120. In such embodiments, the web interface 120 may be embodied as a web portal accessible by the customer communication device 102 to supply data to the virtual queuing system as discussed below. The virtual queuing system 104 also maintains a virtual queue 150 of calls received from the customers, which are subsequently submitted to the call center for handling based on the particular implementation of the virtual queuing system 104. The communication request is a request for communication with a communication agent located in the call center.

The call center 106 may be embodied as any type of call center and may include one or more computers, data servers, telecommunication subsystems, and/or other telephony communication-enabling devices. In some embodiments, the call center 106 may include those structures found in a typical call center. In the illustrative embodiment of FIG. 1, the call center 106 includes a standard dialed number identification service (DNIS) 120 to receive calls made directly to the call center 106 (e.g., directly from the customer communication device 102), an alternate DNIS 122 to receive calls and/or other communications directly from the virtual queuing system 104 over a network 112, and/or a session initiation protocol (SIP) address 124 to receive communications directly from the virtual queuing system 104 over the network 112.

Similar to the network 110, the network 112 may be embodied as any type of network capable of supporting communications between the virtual queuing system 104 and the call center 106. For example, the network 112 may be embodied as, or otherwise include, a telecommunications network, a land-based telephone network, a cellular phone network, a data network, a global publically-accessible network such as the Internet, and/or a combination thereof. Additionally, the network 112 may include various devices, such as routers, switches, hubs, and the like, to facilitate the communications between the virtual queuing system 104 and the call center 106.

In use, a customer may request virtual queuing (i.e., a call back from the call center 106) by submitting a call back request directly to the virtual queuing system 104. The callback request allows the user to avoid the on hold wait time. To do so, the customer may operate the customer communication device 102 to request the call back from and provide associated information to the virtual queuing system by submitting a SMS message to the SMS interface 120 of the virtual queuing system and/or by submitting a web-based request to the web interface 122. In response, the virtual queuing system 104 is configured to contact the call center 106 to submit the customer's information to the call center 106 and subsequently call the customer back when an agent of the call center 106 is available. The virtual call center meters the wait time, as described in greater detail below, prior to the call back operation. In this way, the customer may request virtual queuing (i.e., request a call back) without directly accessing the call center 106.

Figure 2:
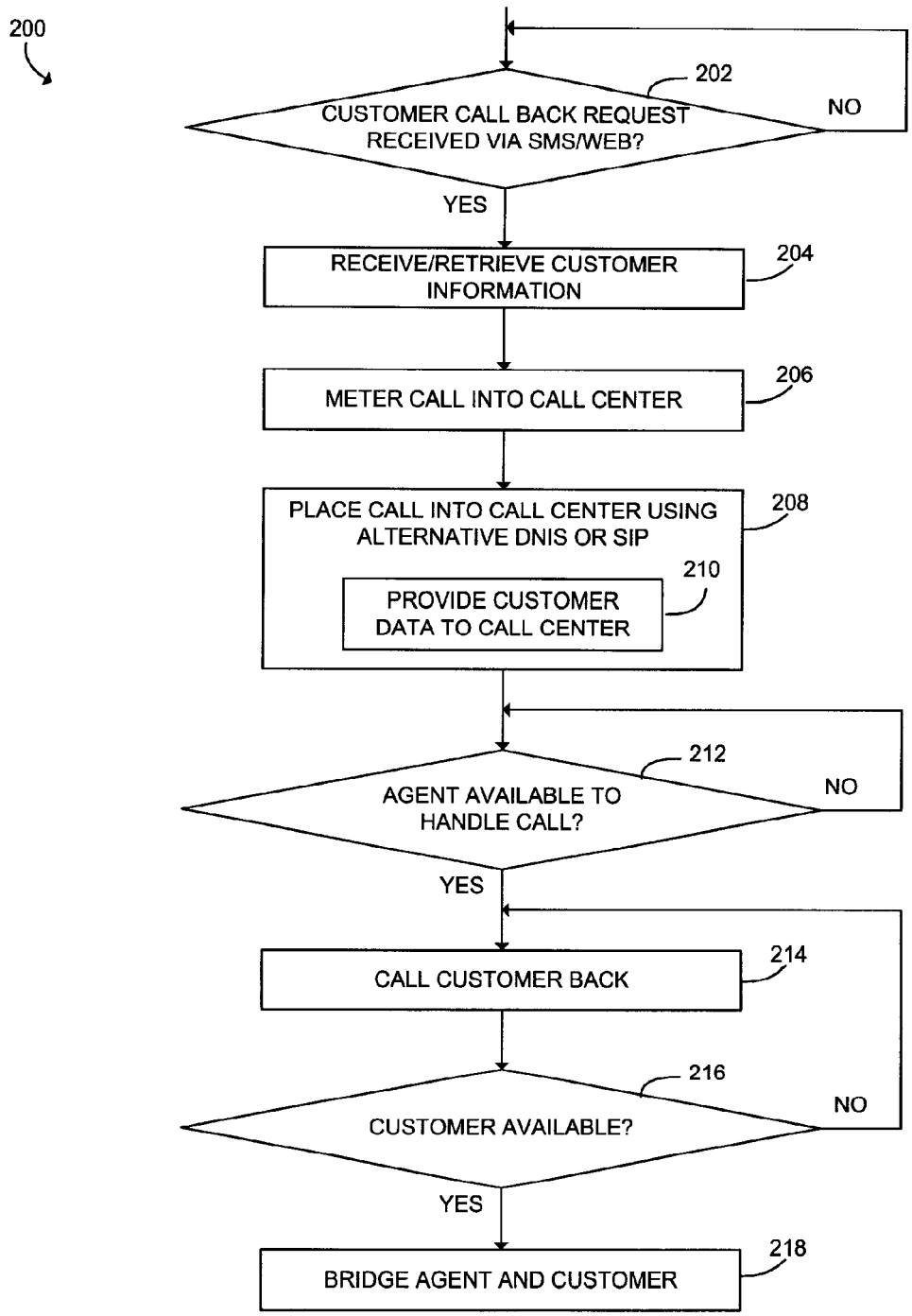
FIG. 2 is a simplified flow diagram of one method for providing virtual queuing that may be executed by a virtual queuing system of the system of FIG. 1.

Referring now to FIG. 2, in operation, the virtual queuing system 104 may execute a method 200 for providing virtual queuing. The illustrative method 200 begins with block 202 in which the virtual queuing system 104 receives a call back request from the user. As noted above, the user submits a communication request for communication with a communication agent of the call center. As discussed above, the virtual queuing system 104 may receive the call back request as a SMS message from the customer communication device 102 via the SMS interface 120 (e.g., a customer may text a call back number), as a web-based request from the customer communication device 102 via the web interface 122, or as another type of call back request from the customer communication device 102 via the additional interface 124. It is noted that in some embodiments, the communication request and the call back request may be supplied within the same communication, for example in the embodiment wherein the user sends a direct call back request message via a messaging or other communication system. Whereas, in further embodiments, the user may first engage the call center and then seek a call back request, where the communication request provides for the initial contact with the call center and the call back request engages the virtual queuing system described herein.

In block 204, the virtual queuing system 104 receives or otherwise retrieves customer information. Such customer information may include, for example, the customer's name, preferred callback phone number, desired callback time, customer ID, order ID, customer record number, summary of the customer's question, product information related to the customer's question or issue, and/or other information related to the customer's call. In some embodiments, some of the customer information may be stored in the virtual queuing system 104 and/or the call center 106. For example, in some embodiments, the customer's name and associated information may be stored in the virtual queuing system 104 in association with the customer's contact information such that the customer's identification may be automatically retrieved and/or populated without the need of the customer supplying such information.

When the user requests the call back operation, the user's communication is then placed in the virtual queuing system 104.

In block 206, the virtual queuing system 104 meters the placement of a call into the call center 106. The virtual queuing system 104 may meter the communication request to the call center 106 as a function of various criteria. For example, in one embodiment, the virtual queuing system 104 meters the call based on an estimated on-hold wait time (EWT), which is the estimated time until an agent of the call center 106 answers the customer's call. Additionally, in some embodiments, the virtual queuing system 104 may meter the call based on a predefined or reference patience factor, which is defined as the amount of time an average customer would rather wait to receive a call relative to the current estimated wait time. For example, if the EWT is 5 minutes, the average customer may be willing to wait 10, 12, or 15 minutes for a call back rather than wait on line. In one particular embodiment, the patience factor is selected to be a number in the range of 2.5 to 3, but may have other values in other embodiments. In this way, telco cost and capacity savings may be realized by the system 100 by delivering calls to agents of the call center 106 at the same rate at which the calls can be answered. It should be appreciated that such call metering techniques may include the appropriate configuration by the call center 106 for the "skill groups" at which the call center 106 is receiving metered calls. For example, the call-metered "skill groups" may require a higher priority setting to ensure that the call-metered calls "trump" the normally queued calls. Other embodiments may include an appropriate "percent allocation" setting across skill groups of the call center 106 to ensure the call-metered calls are allocated to agents. In another embodiment, the metering may be based on user information, including but not limited to information relating to a status or class of user. For example, priority users or members may be given a quicker metering within the priority queue, such as the example of the call center providing customer service for an airline and if the user information includes a frequent flyer number, the user may be given prioritized virtual queue metering.

After expiration of the metered wait time in block 206, the virtual queuing system 104 places a call into the call center 106 over the network 112 in block 208. To do so, the virtual queuing system 104 may place the call into a private or special purpose DNIS (i.e., the alternate DNIS 132). In some embodiments, such a call into the alternate DNIS 132 may be a local call or otherwise generate a charge less than the charge for the customer to call the standard DNIS 130. Additionally or alternatively, the virtual queuing system 104 may place the call into the call center 106 using the SIP address 134 rather than a Direct Inward Dialing (DID) number of the call center.

In some embodiments, the virtual queuing system 104 may submit the customer information to the call center 106 in block 210. Such customer information may be provided to the call center 106 via an audio whisper or in a data header depending on the type of communication established between the virtual queuing system 104 and the call center 106. Once a call is placed to the call center 106, the virtual queuing system 104 waits for an agent of the call center 106 to be available to accept the customer's call in block 212. In this way, the virtual queuing system 104 acts as a proxy for the customer by waiting in the queue of the call center 106.

In some embodiments, the agent may provide confirmation to the virtual queuing system 104 that he/she is ready to accept the call. For example, the agent may be presented with the associated customer information via a screen pop-up or other data screen via computer-telephony integration (CTI) or hear the customer information via an audio whisper. The call center agent may confirm readiness for the call by signaling (e.g., by pressing a respective digit or key on an agent keypad or softphone) to the virtual queuing system 104.

Once an agent of the call center 106 becomes available, the virtual queuing system 104 calls the customer back at the provided call back number in block 214. In some embodiments, if the customer is not available, the virtual queuing system 104 may reattempt the call a predetermined number of times. Additionally, if a customer's voicemail is received, the virtual queuing system 104 may be configured to generate a "canned" or otherwise pre-recorded voicemail. In some embodiments, the placement of the pre-recorded voicemail may be initiated in response to a command (e.g., a specific key or sequence of keys) provided by the agent. The call center agent may then disconnect to move to the next call while the virtual queuing system places the pre-recorded voicemail. In other embodiments, the pre-recorded voicemail is placed without interaction from the agent.

If the customer is determined to be available in block 216 (i.e., the customer answers the call back call), the virtual queuing system 104 bridges the call center agent and the customer in block 218. In some embodiments, the virtual queuing system 104 may playa pre-recorded audio introduction that is customized for a particular call center prior to connecting the customer to the call center agent. In this way, a single virtual queuing system 104 may manage and facilitate multiple call centers, which may be established by different companies.

As discussed above, the customer may reengage the virtual queue at any time during the call back call. For example, if the customer is put on hold of an extended period of time, the customer may opt to receive another call back when the agent has completed whatever task has the agent occupied at that time. To do so, the customer may select a pre-defined key or sequence of keys to opt into the virtual queue. In such embodiments, the call back call may be routed to the same call back agent when appropriate. Additionally, in some embodiments, the virtual queuing system 104 may provide for dropped call callbacks. For example, if the customer's signal goes bad or suddenly drops, the call center agent may select a predefined key or sequence of keys to automatically redial the customer. In this way, the agent need not research the customer contact information to reengage the customer.

Figure 3:
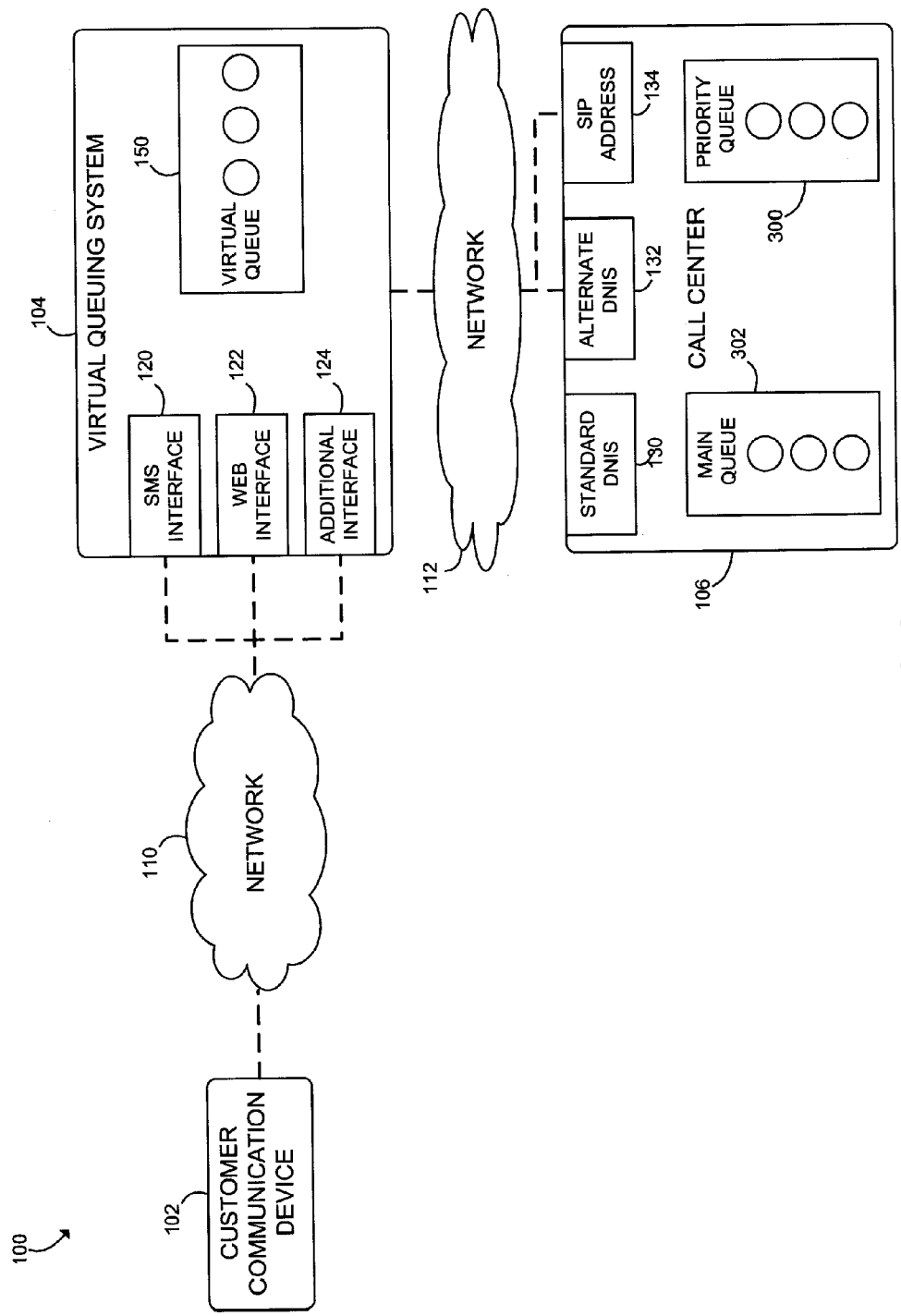
FIG. 3 is a simplified block diagram of another embodiment of a telecommunications system for providing virtual queuing.
Figure 4:
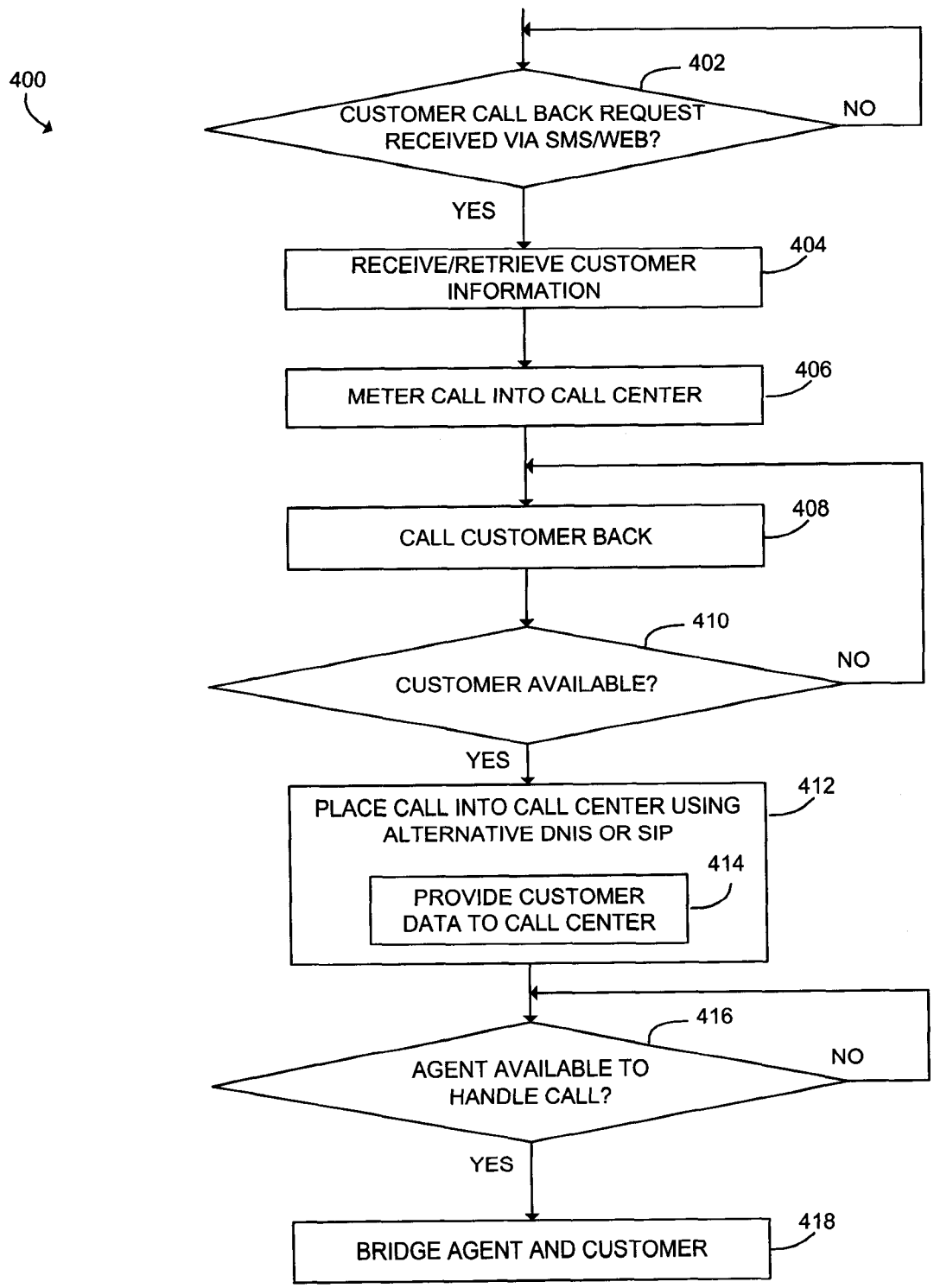
FIG. 4 is a simplified flow diagram of one method for providing virtual queuing that may be executed by a virtual queuing system of the system of FIG. 3.

Referring now to FIGS. 3 and 4, in some embodiments, the virtual queuing system 104 is configured to call the customer back prior to calling the call center. In such embodiments, the virtual queuing system 104 may maintain the virtual queue 150 as discussed above, and the call center may maintain a priority queue 300, in which the call back calls are place, in addition to a main queue 302. As discussed in more detail below, the virtual queuing system 104 may be configured to call the customer back first and, upon successfully reaching the customer, call the call center to place the customer in the priority queue 300.

As shown in FIG. 4, the virtual queuing system 104 may execute a method 400 for providing virtual queuing in the embodiment of FIG. 3. The method 400 begins with block 402 in which the virtual queuing system 104 receives a call back request from the customer. As discussed above with regard to FIG. 1, the virtual queuing system 104 may receive the call back request as a SMS message from the customer communication device 102 via the SMS interface 120 (e.g., a customer may text a call back number), as a web-based request from the customer communication device 102 via the web interface 122, or as another type of call back request from the customer communication device 102 via the additional interface 124.

In block 404, the virtual queuing system 104 receives or otherwise retrieves customer information. Again, such customer information may include, for example, the customer's name, preferred callback phone number, desired callback time, customer ID, order ID, customer record number, summary of the customer's question, product information related to the customer's question or issue, and/or other information related to the customer's call. In some embodiments, some of the customer information may be stored in the virtual queuing system 104 and/or the call center 106.

In block 406, the virtual queuing system 104 meters the customer's call back call based on a queuing factor. The queuing factor can be a function of one or more of various criteria such as the estimated wait time at the call center 106, a patience factor, or other variable as discussed above. Additionally, in some embodiments, the virtual queuing system 104 may consider additional account factors such as how many calls are already in the priority queue 300 and how many calls are active (i.e., an agent has answered the call) that have originated from the virtual queuing system 104. Taking such factors into account, the virtual queuing system 104 may effectively control the flow of calls into the priority queue 300 such that the customer who has been called back is required to wait only a short duration in the priority queue 300. Such flow-control also allows for savings of the telco capacity and usage (e.g., call minutes used).

After expiration of the metered wait time, the virtual queuing system 104 calls the customer back at the provided call back number in block 408. Again, the virtual queuing system 104 may reattempt the call a predetermined number of times if the customer is not available and/or leave a pre-recorded voicemail message if a customer's voicemail is received.

If, however, the customer is reached in block 410, the virtual queuing system 104 places a call into the call center 106 in block 412. To do so, the virtual queuing system 104 may place the call into the alternate DNIS 132 and/or place the call into the call center 106 using the SIP address 134 rather than a Direct Inward Dialing (DID) number of the call center. In some embodiments, the virtual queuing system 104 may submit the customer information to the call center 106 in block 414.

If the call center agent is determined to be available in block 416, the virtual queuing system 104 bridges the customer and the call center agent in block 218. As discussed above, the virtual queuing system 104 may play a pre-recorded audio introduction that is customized for a particular call center prior to connecting the customer to the call center agent. Additionally, the customer may reengage the virtual queue at any time during the call back call. Further, the agent may automatically reengage the call by selecting a predefined key or sequence of keys should the call be dropped.

Referring now to FIGS. 5-10, in some embodiments, the virtual queuing system 104 may provide virtual queuing by "wrapping" the customer call or call center. In such embodiments, the customer may place a call to the call center 106, which is subsequently re-routed through the virtual queuing system 104. When the call is re-routed in this way, two separate call legs are created. One call leg is embodied as the inbound call leg from the customer's communication device 102 to the virtual queuing system 104, while the other call leg is the outbound call leg from the virtual queuing service to the call center 106. When the two call legs are bridged by the virtual queuing system 104, the caller may interact with the call center 106 as normal (i.e., as if the call was not re-routed through the virtual queuing system). However, because the call has been re-routed through the virtual queuing system, the customer may elect callback at any time during the queuing period. In this way, the customer's call into the call center 106 is "wrapped" by the virtual queuing system 104.

Figure 5:
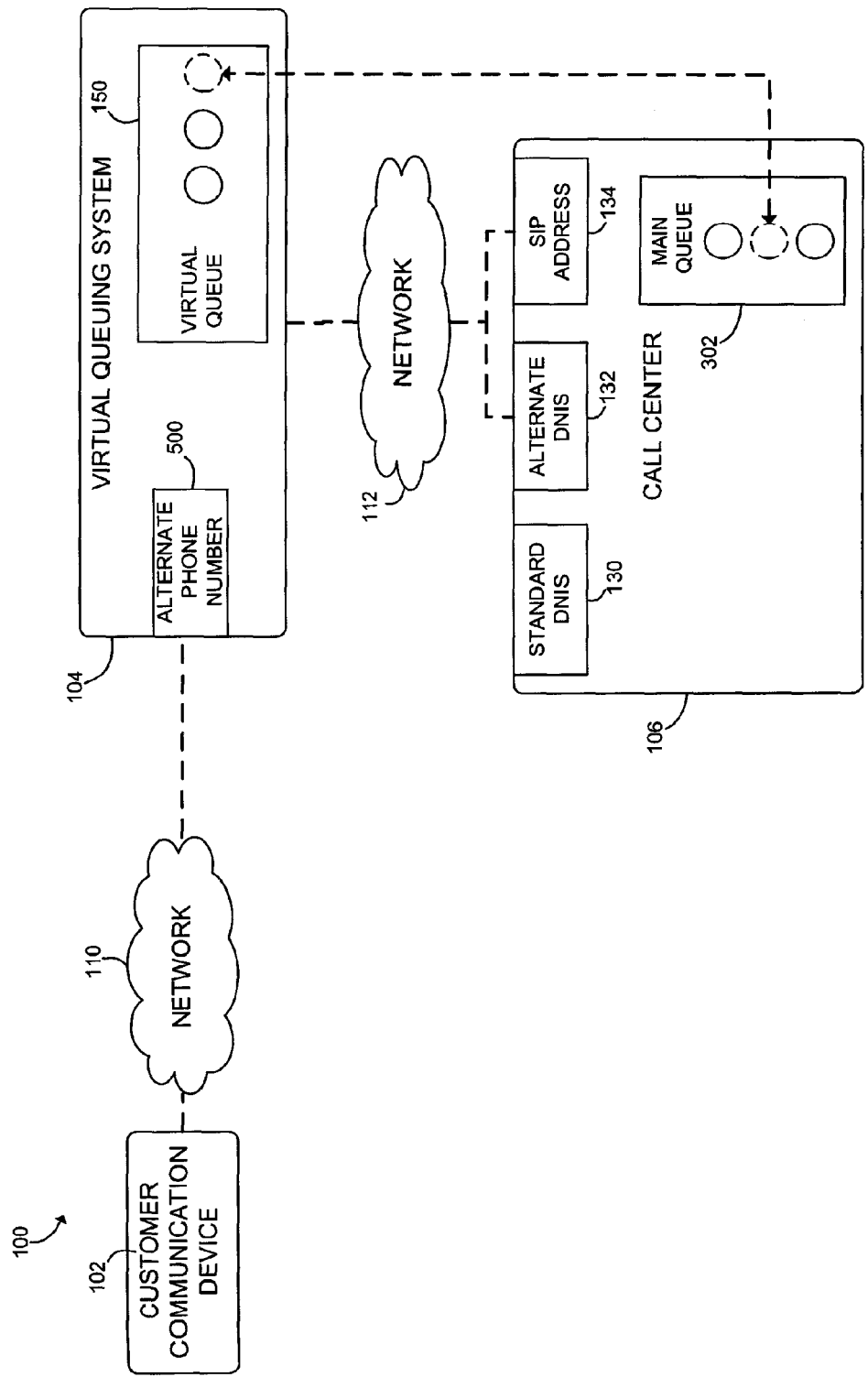
FIG. 5 is a simplified block diagram of another embodiment of a telecommunications system for providing virtual queuing.

Referring now to FIG. 5, one embodiment of such a virtual queuing "wrapper" system is shown. In such embodiment, the virtual queuing system 104 may include an alternate phone number 500, which may be published by the call center as a direct call-in number for the call center 106. However, instead of reaching the call center 106, the customer is actually calling a number that terminates at the virtual queuing system 104. The virtual queuing system 104 maintains the virtual queue 150, which is populated from the main queue 302 of the call center 106 when a customer opts for a call back.

Figure 6:
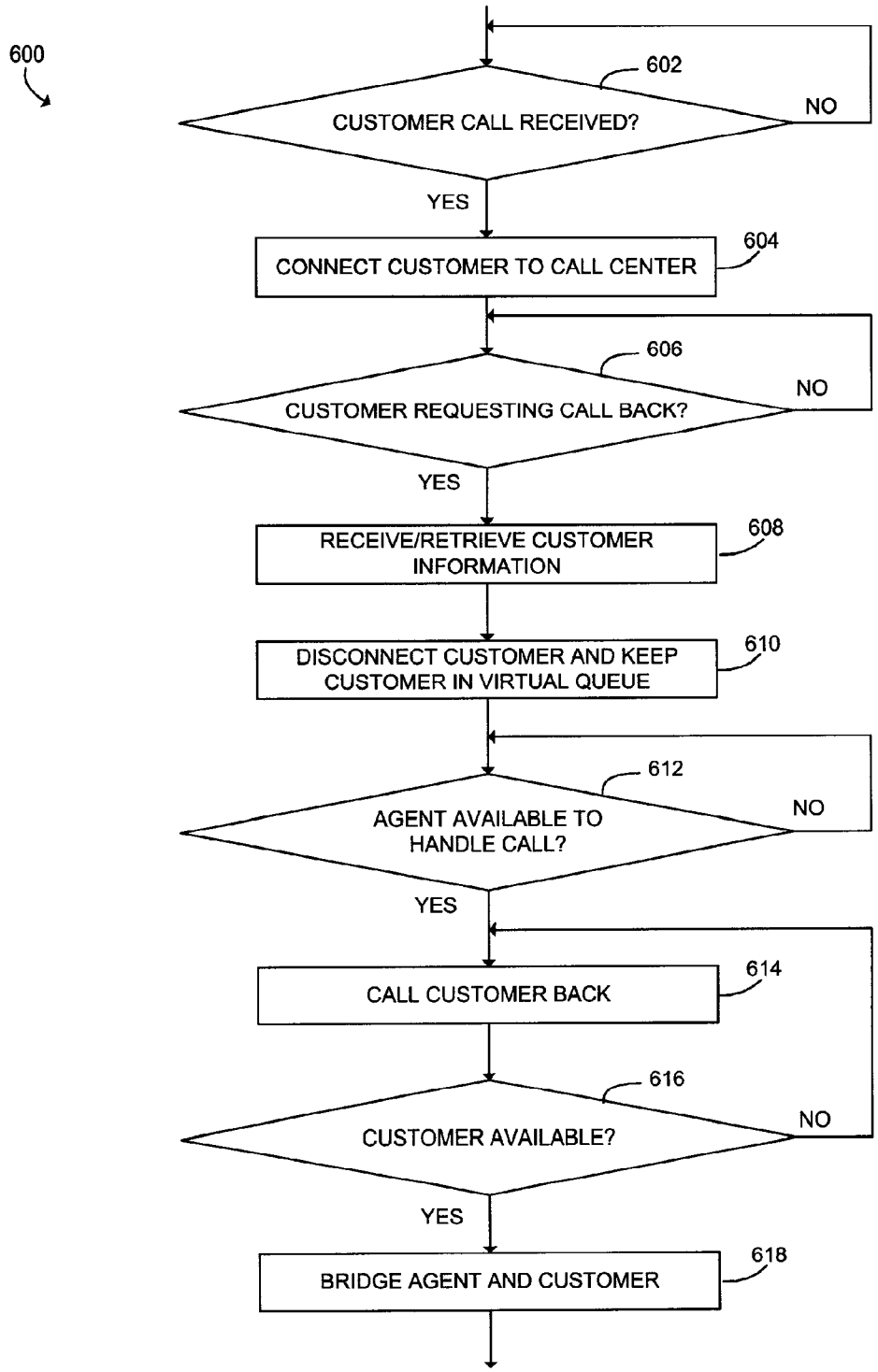
FIG. 6 is a simplified flow diagram of one method for providing virtual queuing that may be executed by a virtual queuing system of the system of FIG. 5.

As shown in FIG. 6, the virtual queuing system 104 may execute a method 600 for providing virtual queuing in the embodiment of FIG. 5. The method 600 begins with block 602 in which the virtual queuing system 104 determines whether a customer call is received. As discussed above, the customer may call into the alternate phone number 500 that terminates at the virtual queuing system 104. If a customer call is received on the alternate phone number 500, the method advances to block 604 in which the customer is connected to the call center 106. To do so, the customer's call may be placed in the main queue 302 of the call center 106 and answered by an agent of the call center 106 in the order of the main queue 302. However, because the customer call has been "wrapped" by the virtual queuing system 104, the customer may opt to receive a callback at any time (e.g., by selecting a predefined key or sequence of keys). As such, if the customer waits in the main queue 302 for some time, the customer may decide to receive a callback rather than continue waiting in the main queue 302. Alternatively, in other embodiments, the customer may simply abandon the call without having pressed any predefined key or key sequence to request a callback. In such embodiments, the virtual queuing system 104 assumes the queue spot of the abandoned call in the main queue 302 of the call center 106. Such embodiments may be referred to as "zero-abandon" systems because the call center 106 is able to easily recover would-be abandoned callers.

If the customer does request to receive a callback in block 606, the method 600 advances to block 608 in the virtual queuing system 104 receives or otherwise retrieves customer information. As discussed above in regard to method 200 of FIG. 2, such customer information may include, for example, the customer's name, preferred callback phone number, desired callback time, customer ID, order ID, customer record number, summary of the customer's question, product information related to the customer's question or issue, and/or other information related to the customer's call. In some embodiments, some of the customer information may be stored in the virtual queuing system 104 and/or the call center 106. For example, in some embodiments, the customer's name and associated information may be stored in the virtual queuing system 104 in association with the customer's contact information such that the customer's identification may be automatically retrieved and/or populated without the need of the customer supplying such information.

After the customer information is received or retrieved in block 608, the virtual queuing system 104 disconnects from the customer and maintains the customer's call in the virtual queue 150 in block 610. Subsequently, in block 612, the virtual queuing system 104 waits for an agent of the call center 106 to be available to accept the customer's call. Once an agent of the call center 106 becomes available, the virtual queuing system 104 calls the customer back at the provided call back number in block 614. As discussed above with regard to method 200 of FIG. 2, the virtual queuing system 104 may reattempt the call a predetermined number of times if the customer is not available and/or leave a pre-recorded voicemail message if a customer's voicemail is received.

If the customer is determined to be available in block 616 (i.e., the customer answers the call back call), the virtual queuing system 104 bridges the call center agent and the customer in block 618. In some embodiments, as discussed above with regard to method 200, the virtual queuing system 104 may playa pre-recorded audio introduction that is customized for a particular call center prior to connecting the customer to the call center agent. Additionally, the customer may reengage the virtual queue at any time during the call back call. For example, if the customer is put on hold of an extended period of time, the customer may opt to receive another call back when the agent has completed whatever task has the agent occupied at that time. Further, in some embodiments, the virtual queuing system 104 may provide for dropped call callbacks. For example, if the customer's signal goes bad or suddenly drops, the call center agent may select a predefined key or sequence of keys to automatically redial the customer.

Figure 7:
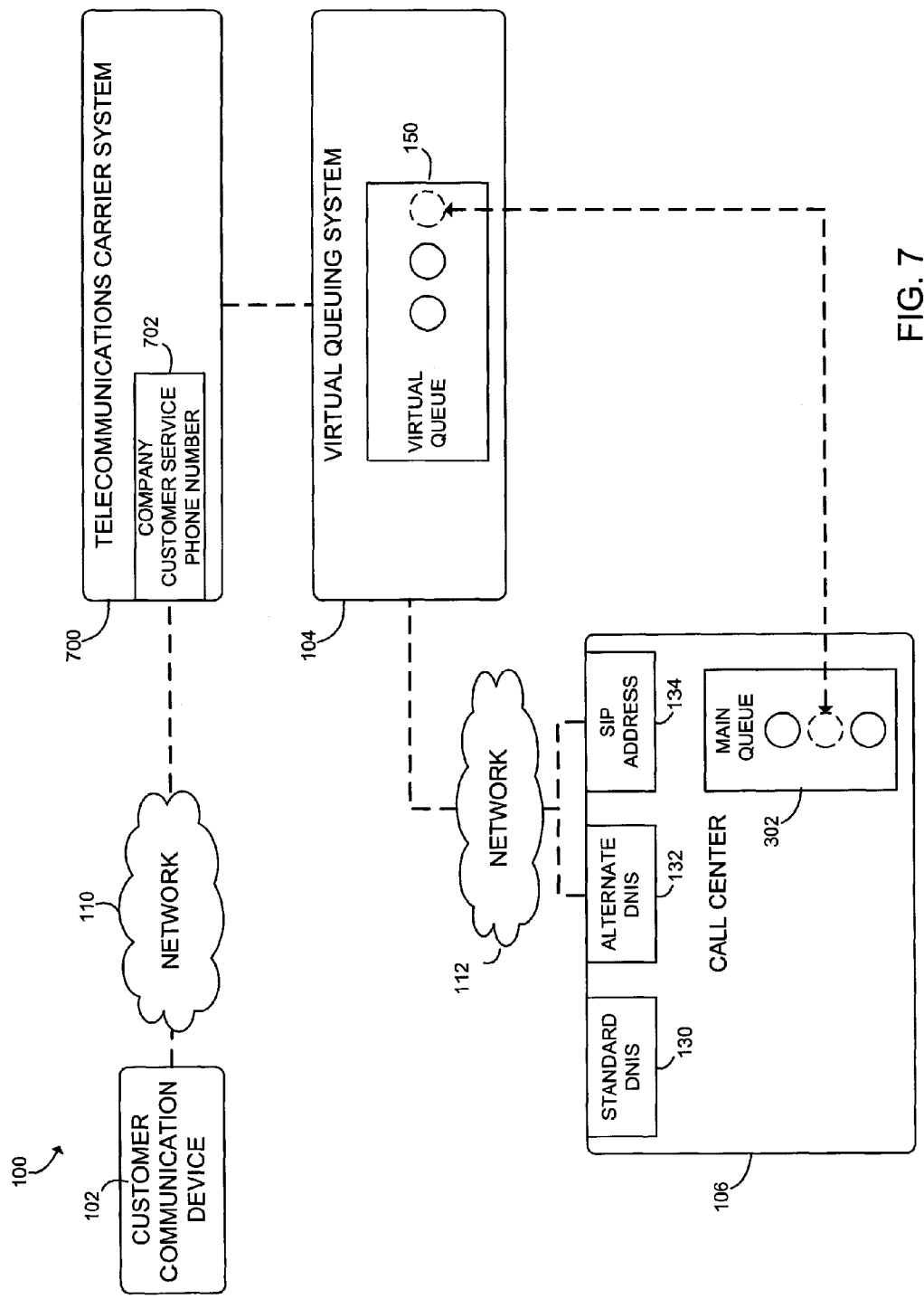
FIG. 7 is a simplified block diagram of another embodiment of a telecommunications system for providing virtual queuing.
Figure 8:
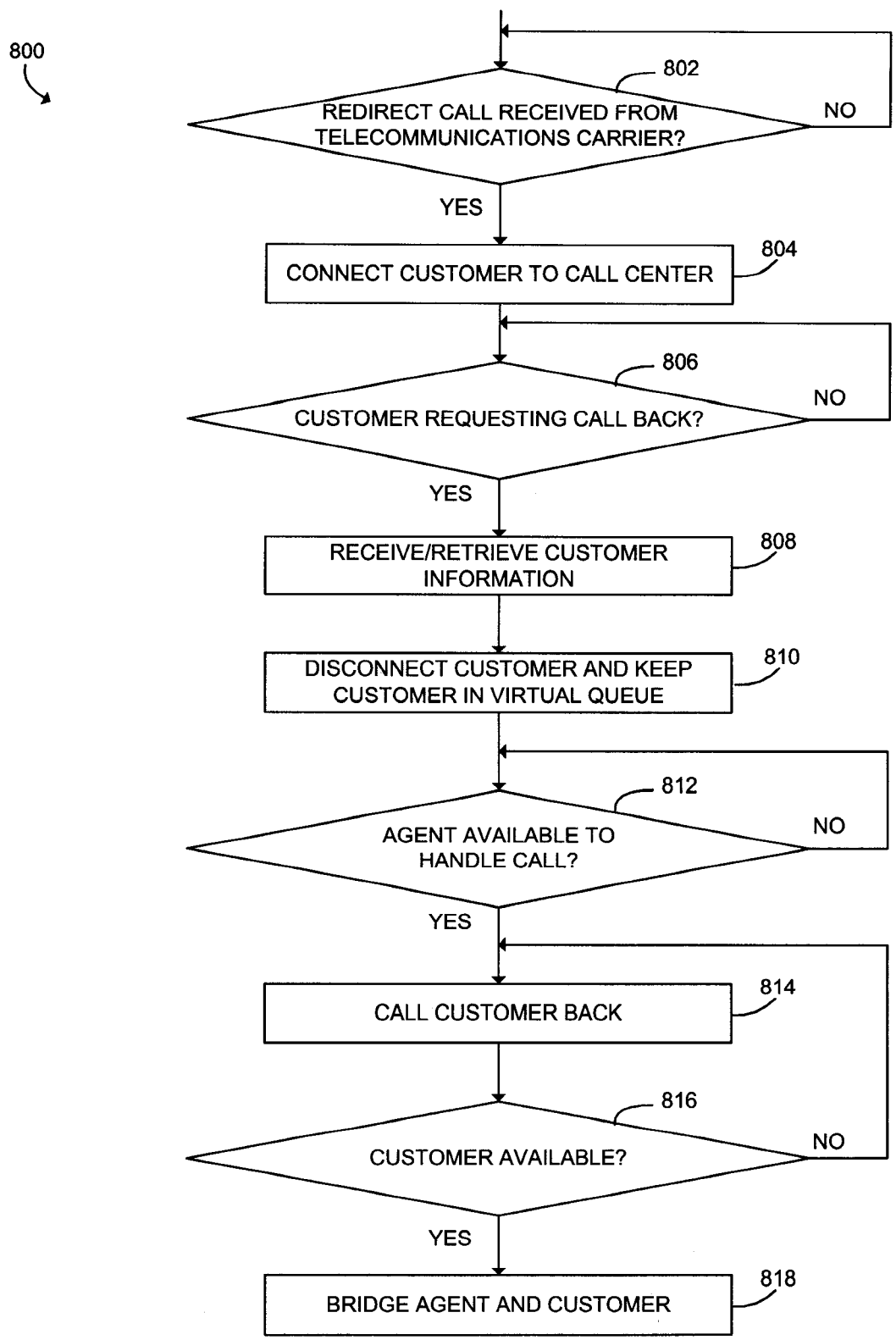
FIG. 8 is a simplified flow diagram of one method for providing virtual queuing that may be executed by a virtual queuing system of the system of FIG. 7.

Referring now to FIGS. 7 and 8, in some embodiments, the customer's call is "wrapped" by the virtual queuing system 104 in response to the customer's call being redirected to the virtual queuing system 104 by a telecommunications carrier system. That is, although the customer may call the direct number of the call center 106, the customer's call may be re-routed to the virtual queuing system 104 in response to predefined criteria (e.g., the volume of calls received by the call center within a given time period, the magnitude of the estimated wait time, and/or the like). In such embodiments, as shown in FIG. 7, the telecommunications system 100 may include a telecommunications carrier system 700. The telecommunications carrier system 700 may be embodied as any type of telecommunications carrier system for facilitating and managing calls between the customer communication device 102 and the call center 106. For example, the telecommunication carrier system 700 may be embodied as a cellular carrier system, a land-based carrier system, or a data network communication system. Additionally, the telecommunication carrier system 700 may form a portion of the network 110 in some embodiments. The illustrative telecommunication carrier system 700 includes a company customer service phone number 702. Calls received on the service phone number 702 may be typically routed to the standard DNIS 130 of the call center 106. However, under certain circumstances (e.g., large volume of calls, high estimated wait time, etc.), the telecommunication carrier system 700 may redirect calls from the call center 106 to the virtual queuing system 104. The virtual queuing system 104 may subsequently provide virtual queuing services to the customer as discussed previously.

As shown in FIG. 8, the virtual queuing system 104 may execute a method 800 for providing virtual queuing in the embodiment of FIG. 7. The method 800 begins with block 902 in which the virtual queuing system 104 determines whether a redirected customer call is received from the telecommunications carrier system 700. As discussed above, the telecommunication carrier system 700 may redirect calls from the call center 106 to the virtual queuing system 104 under certain conditions such as a large volume of incoming calls to the call center 106, a high estimated wait time (EWT), and/or other criteria. If a redirected call is received by the virtual queuing system 104, the virtual queuing system 104 subsequently connects the customer call to the call center 106 in block 804. To do so, the customer's call may be placed in the main queue 302 of the call center 106 and answered by an agent of the call center 106 in the order of the main queue 302. However, because the customer call has been "wrapped" by the virtual queuing system 104, the customer may opt to receive a callback at any time (e.g., by selecting a predefined key or sequence of keys). As such, if the customer waits in the main queue 302 for some time, the customer may decide to receive a callback rather than continue waiting in the main queue 302.

If the customer does request to receive a callback in block 806, the method 800 advances to block 808 in the virtual queuing system 104 receives or otherwise retrieves customer information. As discussed above in regard to method 200 of FIG. 2, such customer information may include, for example, the customer's name, preferred callback phone number, desired callback time, customer ID, order ID, customer record number, summary of the customer's question, product information related to the customer's question or issue, and/or other information related to the customer's call.

After the customer information is received or retrieved in block 808, the virtual queuing system 104 disconnects from the customer and maintains the customer's call in the virtual queue 150 in block 810. Subsequently, in block 812, the virtual queuing system 104 waits for an agent of the call center 106 to be available to accept the customer's call. Once an agent of the call center 106 becomes available, the virtual queuing system 104 calls the customer back at the provided call back number in block 814. As discussed above with regard to method 200 of FIG. 2, the virtual queuing system 104 may reattempt the call a predetermined number of times if the customer is not available and/or leave a pre-recorded voicemail message if a customer's voicemail is received.

If the customer is determined to be available in block 816 (i.e., the customer answers the call back call), the virtual queuing system 104 bridges the call center agent and the customer in block 818. In some embodiments, as discussed above with regard to method 200, the virtual queuing system 104 may playa pre-recorded audio introduction that is customized for a particular call center prior to connecting the customer to the call center agent. Additionally, the customer may reengage the virtual queue at any time during the call back call. For example, if the customer is put on hold of an extended period of time, the customer may opt to receive another call back when the agent has completed whatever task has the agent occupied at that time. Further, in some embodiments, the virtual queuing system 104 may provide for dropped call callbacks. For example, if the customer's signal goes bad or suddenly drops, the call center agent may select a predefined key or sequence of keys to automatically redial the customer.

Figure 9:
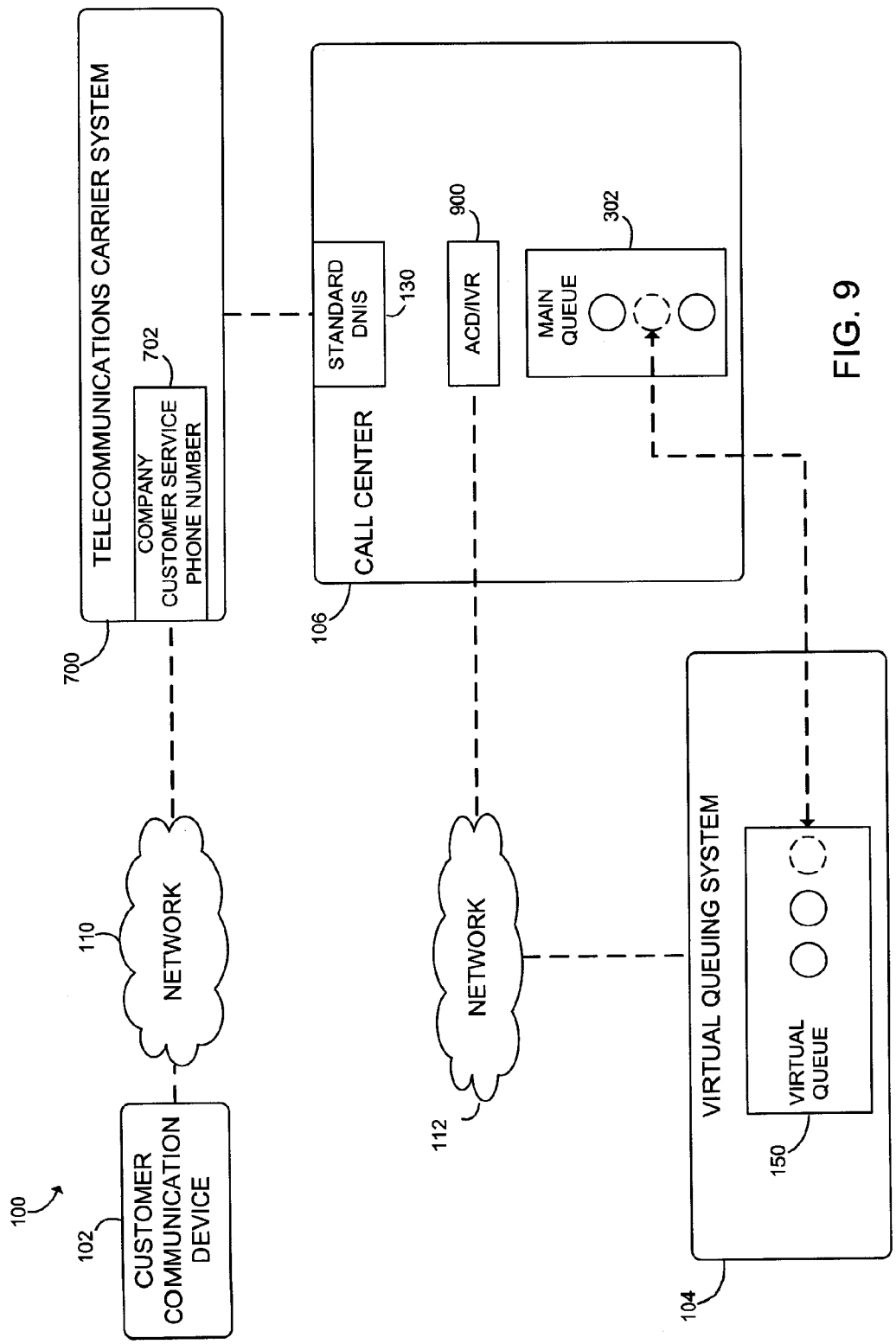
FIG. 9 is a simplified block diagram of another embodiment of a telecommunications system for providing virtual queuing.
Figure 10:
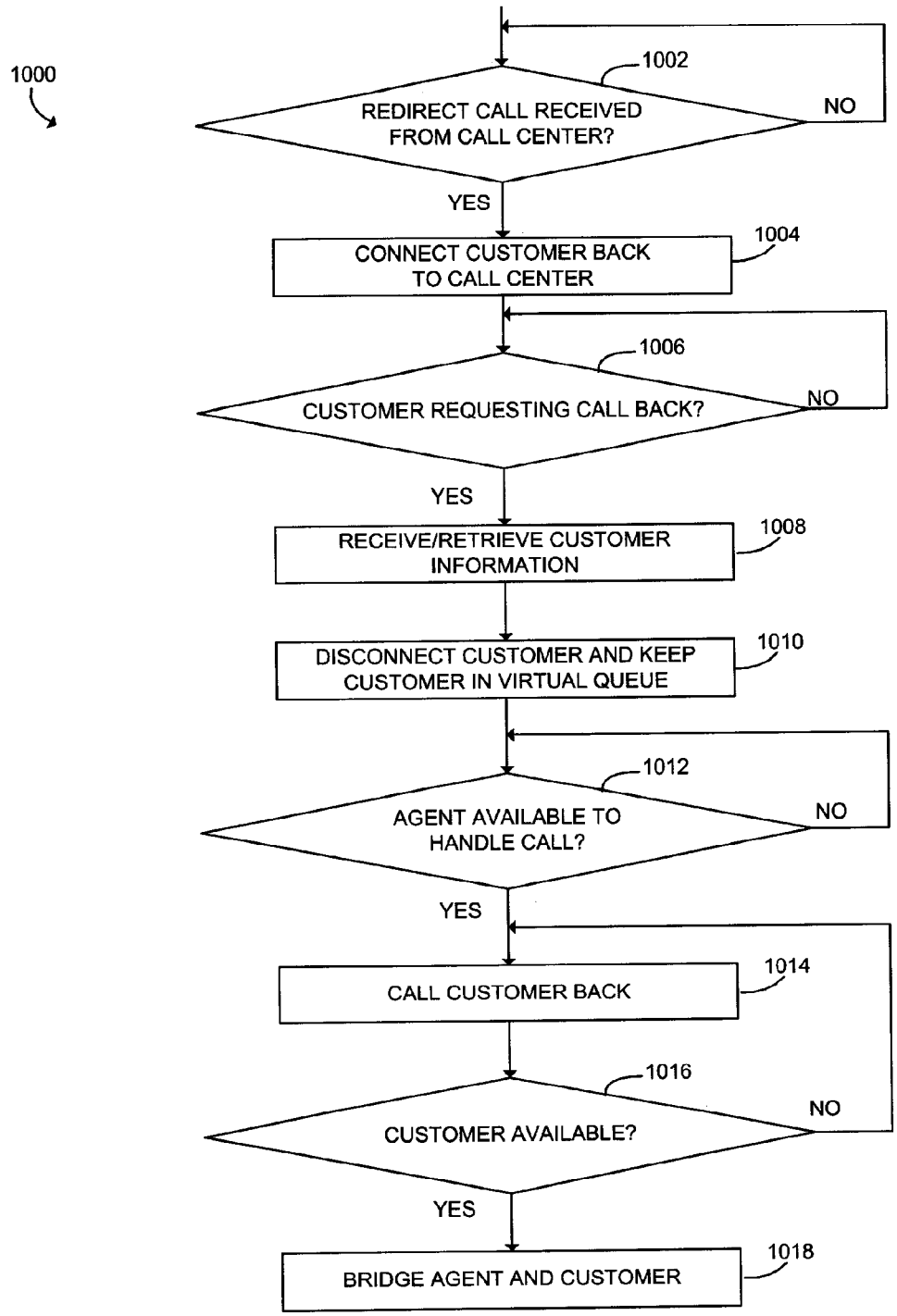
FIG. 10 is a simplified flow diagram of one method for providing virtual queuing that may be executed by a virtual queuing system of the system of FIG. 9.

Referring now to FIGS. 9 and 10, in some embodiments, the call center 106 may redirect received calls from the telecommunications carrier system 700 to the virtual queuing system 104 automatically (i.e., for every call) or in response to predefined criteria (e.g., the volume of calls received by the call center within a given time period, the magnitude of the estimated wait time, and/or the like). In such embodiments, the call center 106 receives calls from the telecommunication scarier system 700 via the standard DNIS 130 and redirects the calls to the virtual queuing system 104 at an automatic call distributor (ACD) or an interactive voice response (IVR) level 900. The virtual queuing system 104 may subsequently provide virtual queuing services to the customer as discussed previously.

As shown in FIG. 10, the virtual queuing system 104 may execute a method 1000 for providing virtual queuing in the embodiment of FIG. 9. The method 1000 begins with block 1002 in which the virtual queuing system 104 determines whether a redirected customer call is received from the call center 106. As discussed above, the call center 106 may redirect calls received from the telecommunications carrier system 700 to the virtual queuing system 104 automatically or in response to certain conditions such as a large volume of incoming calls to the call center 106, a high estimated wait time (EWT), and/or other criteria. If a redirected call is received by the virtual queuing system 104, the virtual queuing system 104 subsequently connects the customer call to the call center 106 in block 1004. To do so, the customer's call may be placed in the main queue 302 of the call center 106 and answered by an agent of the call center 106 in the order of the main queue 302. However, because the customer call has been "wrapped" by the virtual queuing system 104, the customer may opt to receive a callback at any time (e.g., by selecting a predefined key or sequence of keys). As such, if the customer waits in the main queue 302 for some time, the customer may decide to receive a callback rather than continue waiting in the main queue 302.

If the customer does request to receive a callback in block 1006, the method 1000 advances to block 1008 in the virtual queuing system 104 receives or otherwise retrieves customer information. As discussed above in regard to method 200 of FIG. 2, such customer information may include, for example, the customer's name, preferred callback phone number, desired callback time, customer ID, order ID, customer record number, summary of the customer's question, product information related to the customer's question or issue, and/or other information related to the customer's call.

After the customer information is received or retrieved in block 1008, the virtual queuing system 104 disconnects from the customer and maintains the customer's call in the virtual queue 150 in block 1010. Subsequently, in block 1012, the virtual queuing system 104 waits for an agent of the call center 106 to be available to accept the customer's call. Once an agent of the call center 106 becomes available, the virtual queuing system 104 calls the customer back at the provided call back number in block 1014. As discussed above with regard to method 200 of FIG. 2, the virtual queuing system 104 may reattempt the call a predetermined number of times if the customer is not available and/or leave a pre-recorded voicemail message if a customer's voicemail is received.

If the customer is determined to be available in block 1016 (i.e., the customer answers the call back call), the virtual queuing system 104 bridges the call center agent and the customer in block 1018. In some embodiments, as discussed above with regard to method 200, the virtual queuing system 104 may playa pre-recorded audio introduction that is customized for a particular call center prior to connecting the customer to the call center agent. Additionally, the customer may reengage the virtual queue at any time during the call back call. For example, if the customer is put on hold of an extended period of time, the customer may opt to receive another call back when the agent has completed whatever task has the agent occupied at that time. Further, in some embodiments, the virtual queuing system 104 may provide for dropped call callbacks. For example, if the customer's signal goes bad or suddenly drops, the call center agent may select a predefined key or sequence of keys to automatically redial the customer.

Figure 11:
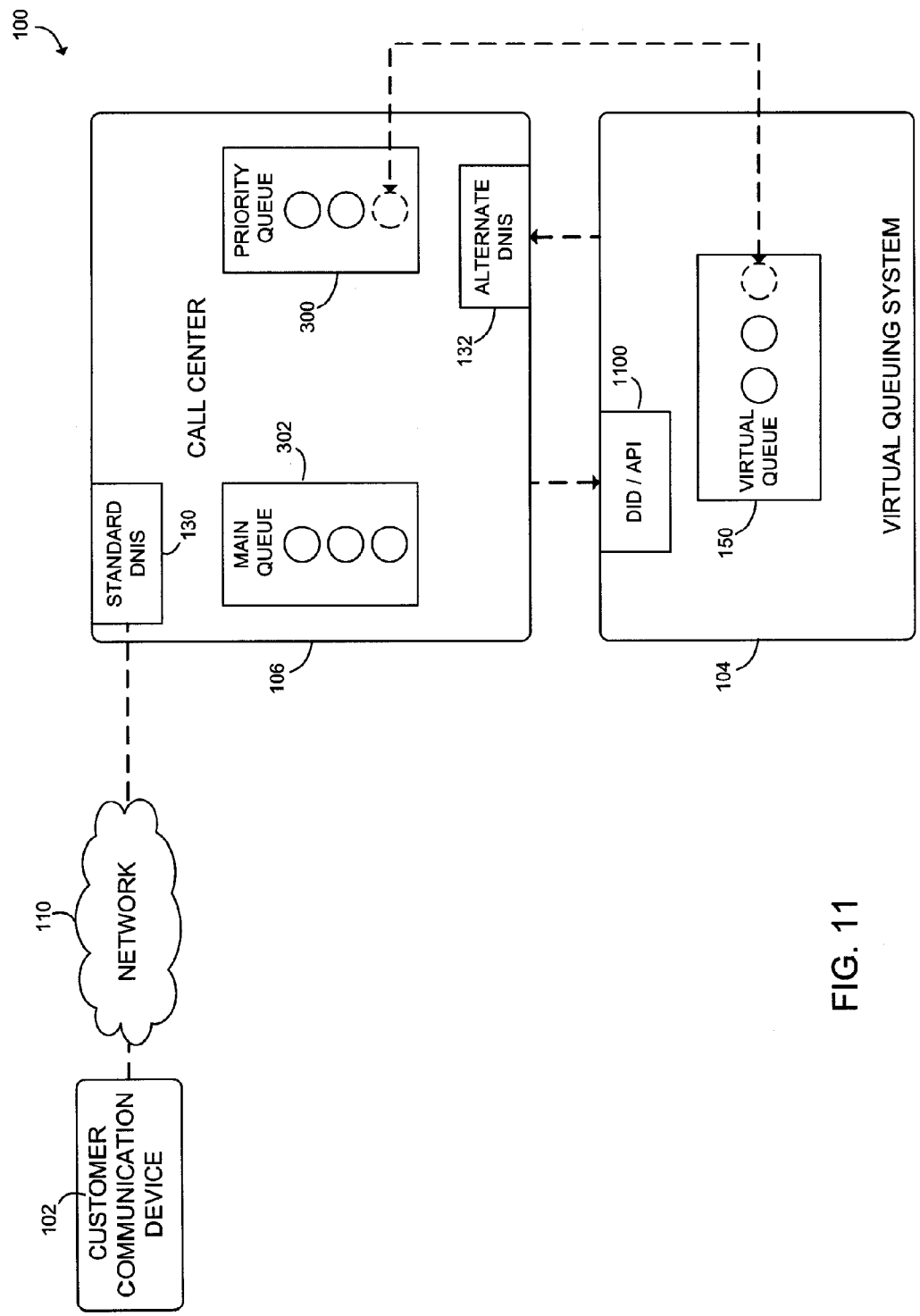
FIG. 11 is a simplified block diagram of another embodiment of a telecommunications system for providing virtual queuing.
Figure 12:
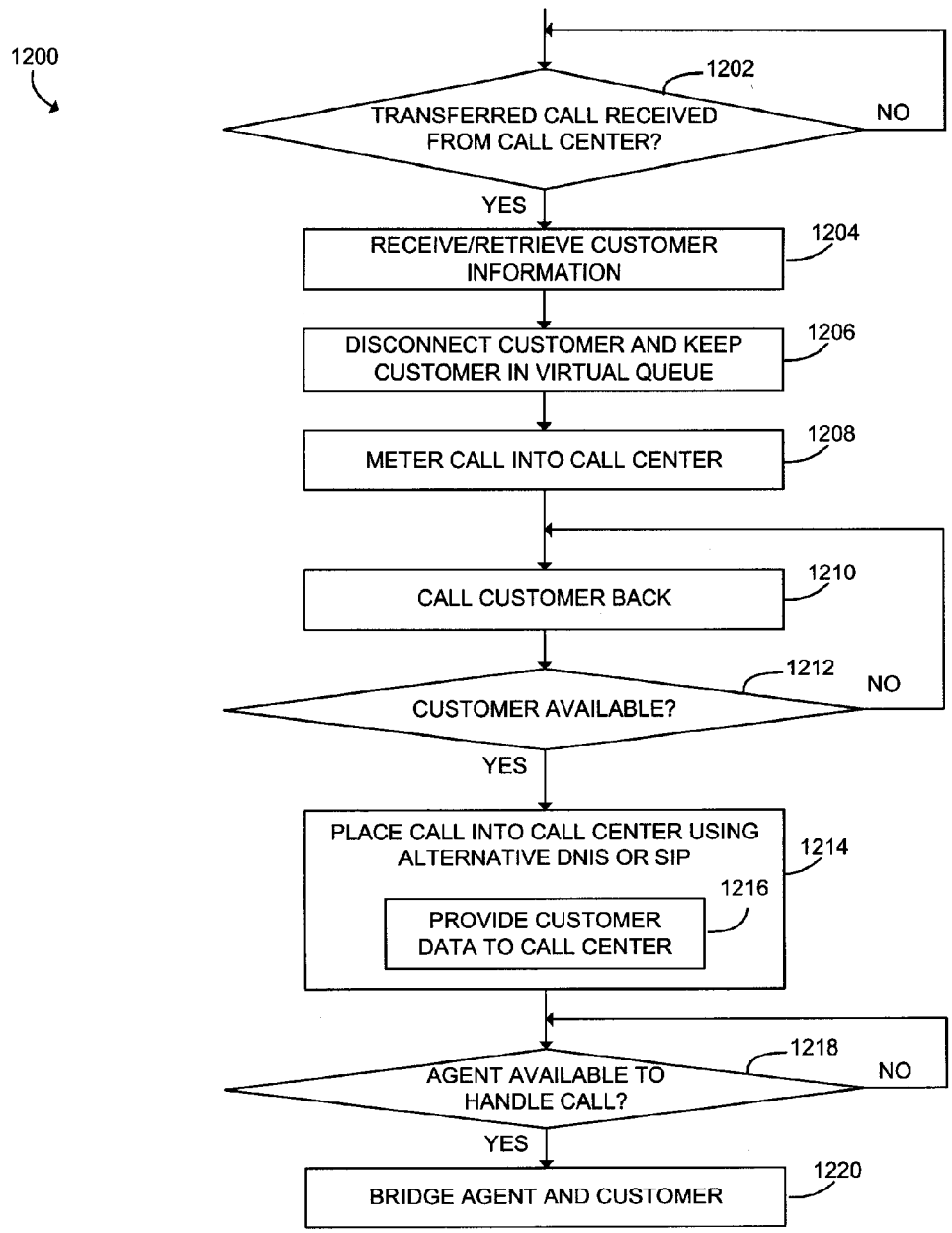
FIG. 12 is a simplified flow diagram of one method for providing virtual queuing that may be executed by a virtual queuing system of the system of FIG. 11.

Referring now to FIGS. 11 and 12, in some embodiments, the call center 106 may initially receive the customer's direct call and provide the option of virtual queuing during such call (e.g., prior to queuing or at the start of the queue). If a customer selects virtual queuing, the call center 106 may transfer the call to the virtual queuing system 104. To do so, the call center 106 may transfer the call to a pre-designed phone number or direct inward dial (DID) number 1100 maintained by the virtual queuing system 104 or via use of another API 1100 provided by the virtual queuing system 104. The virtual queuing system 104 may subsequently provide virtual queuing services to the customer as discussed below.

As shown in FIG. 12, the virtual queuing system 104 may execute a method 1200 for providing virtual queuing in the embodiment of FIG. 11. The method 1200 begins with block 1002 in which the virtual queuing system 104 determines whether a transferred customer call is received from the call center 106. As discussed above, the call center 106 may transfer customer calls in response to the customer selecting the virtual queuing service (e.g., the customer may select a predefined key or sequence of keys). If a transferred call is received by the virtual queuing system 104, the virtual queuing system 104 subsequently receives or otherwise retrieves customer information in block 1204. As discussed above in regard to method 200 of FIG. 2, such customer information may include, for example, the customer's name, preferred callback phone number, desired callback time, customer ID, order ID, customer record number, summary of the customer's question, product information related to the customer's question or issue, and/or other information related to the customer's call.

After the customer information is received or retrieved in block 1204, the virtual queuing system 104 disconnects from the customer and maintains the customer's call in the virtual queue 150 in block 1206. Subsequently, in block 1208, the virtual queuing system 104 meters the customer's call back call as a function of various criteria such as the estimated wait time at the call center 106, a patience factor, or other variable as discussed above with regard to method 200 of FIG. 2. After expiration of the metered wait time, the virtual queuing system 104 calls the customer back at the provided call back number in block 1210. Again, the virtual queuing system 104 may reattempt the call a predetermined number of times if the customer is not available and/or leave a pre-recorded voicemail message if a customer's voicemail is received.

If, however, the customer is reached in block 1210, the virtual queuing system 104 places a call into the call center 106 in block 1214. To do so, the virtual queuing system 104 may place the call into the alternate DNIS 132 of the call center 106. In some embodiments, the virtual queuing system 104 may submit the customer information to the call center 106 in block 1216.

If the call center agent is determined to be available in block 1218, the virtual queuing system 104 bridges the customer and the call center agent in block 1220. As discussed above, the virtual queuing system 104 may play a pre-recorded audio introduction that is customized for a particular call center prior to connecting the customer to the call center agent. Additionally, the customer may reengage the virtual queue at any time during the call back call. Further, the agent may automatically reengage the call by selecting a predefined key or sequence of keys should the call be dropped.

Therein, the present method and system overcomes the shortcomings of the prior techniques by providing a virtual queue system that offloads call back queuing operations from a call center. In one embodiment, the user directly contacts the call center using a communication request and then engages the virtual queue with a call back request at any time during the call center engagement. In another embodiment, the user can directly contact the virtual queue combining the communication request and the call back request. The virtual queuing system meters the communication request to therein engage the user, also referred to as customer, at a properly determined time. The virtual queue includes, at the designated time, transferring the user's communication request to a priority queue based on the call center having an available agent. The designated time can be determined based on a variety of factors, including the patience factor by way of example. Thus, when the agent is available, the user and agent are bridged to communicate with each other. Whereas, the present method and system further improves call center efficiency based on using a priority queue or similar techniques for bridging the user and the agent without causing the agent to wait for the user to be available.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A method for managing a call to avoid an on-hold wait time associated with a main queue of a call center, the method comprising:
    receiving a communication request from a user for telephonic communication with a communication agent via the call center, wherein the communication request includes user information;
    receiving a call back request from the user to avoid the on-hold wait time associated with being placed in the main queue of the call center;
    based on the call back request, placing the communication request and the user information associated therewith into a virtual queuing system having a virtual queue different from the main queue;
    metering the communication request in the virtual queue for a metered wait time based at least on a queuing factor such that the metered wait time for the virtual queue may be different from the on-hold wait time of the main queue; and
    after expiration of the metered wait time, bridging a communication connection between the user and the communication agent including transferring the user information out of the virtual queue of the virtual queuing system and into call center.

2. The method of claim 1, wherein the queuing system is located external to the call center having the communication agent therein, the virtual queuing system in communication with the call center via a networked connection.

3. The method of claim 2, wherein the communication request includes the call back request and is received directly from the user via at least one of: a short messaging system interface and a web interface.

4. The method of claim 1, wherein the user information includes at least one of: a user name, a user account information, a user callback number, and call purpose information.

5. The method of claim 1 further comprising:
    contacting the call center having the communication agent associated therewith; and
    confirming communication agent engagement of the communication request prior to bridging the communication connection.

6. The method of claim 5 further comprising:
    after expiration of the metered wait time, transferring the communication request to a priority queue in the call center; and
    engaging the user via a call back call prior to bridging the communication connection.

7. The method of claim 6, wherein the contacting the user via the call back call occurs prior to the engaging the communication agent.

8. The method of claim 5, wherein the queuing system contacts the call center via at least one of: a special purpose dialed number identification service and a session initiation protocol address.

9. The method of claim 1, wherein the metering the communication request including utilizing a patience factor associated with the on-hold wait time.

10. The method of claim 9, wherein the patience factor is a multiplication factor such that the metered wait time is a product of the on-hold wait time and the patience factor.

11. A system for managing a call to avoid an on-hold wait time associate with a main queue of a call center, the system comprising:
    at least one processing device;
    a virtual queuing system having a virtual queue therein; and
    a computer readable medium having executable instructions stored therein, such that the processing device is, in response to the executable instructions, operative to:
    receive a communication request from a user for telephonic communication with a communication agent via the call center, wherein the communication request includes user information;
    receive a call back request from the user to avoid the on-hold wait time associated with being placed in the main queue of the call center;
    based on the call back request, place the communication request and the user information associated therewith into the virtual queue of the virtual queuing system;
    metering the communication request in the virtual queue for a metered wait time based at least on a queuing factor such that the metered wait time for the virtual queue may be different from the on-hold wait time of the main queue; and
    after expiration of the metered wait time, bridging a communication connection between the user and the communication agent, including transferring the user information out of the virtual queue of the virtual queuing system and into the call center.

12. The system of claim 11, wherein the queuing system is located external to the call center having the communication agent therein, the virtual queuing system in communication with the call center via a networked connection.

13. The system of claim 12, wherein the communication request includes the call back request and is received directly from the user via at least one of: a short messaging system interface and a web interface.

14. The system of claim 11, wherein the user information includes at least one of: a user name, a user account information, a user callback number, and call purpose information.

15. The system of claim 11, wherein the processing device, in response to further executable instructions, is further operative to:
   contact the call center having the communication agent associated therewith; and
   confirm communication agent engagement of the communication request prior to bridging the communication connection.

16. The system of claim 15, wherein the processing device, in response to further executable instructions, is further operative to:
   after expiration of the metered wait time, transfer the communication request to a priority queue in the call center; and
   engage the user via a call back call prior to bridging the communication connection.

17. The system of claim 16, wherein the contacting the user via the call back call occurs prior to the engaging the communication agent.

18. The system of claim 15, wherein the queuing system contacts the call center via at least one of: a special purpose dialed number identification service and a session initiation protocol address.

19. The system of claim 11, wherein the metering the communication request including utilizing a patience factor associated with the on-hold wait time.

20. The system of claim 19, wherein the patience factor is a multiplication factor such that the metered wait time is a product of the on-hold wait time and the patience factor.

* * * * *